(No Model.)

E. HARRIS.
SAW TOOTH.

No. 381,011. Patented Apr. 10, 1888.

Witnesses
Geo. Thorpe
J. W. Garner

Inventor.
Enoch Harris.
By his Attorneys.

UNITED STATES PATENT OFFICE.

ENOCH HARRIS, OF EVANSVILLE, INDIANA.

SAW-TOOTH.

SPECIFICATION forming part of Letters Patent No. 381,011, dated April 10, 1888.

Application filed January 17, 1888. Serial No. 261,015. (No model.)

*To all whom it may concern:*

Be it known that I, ENOCH HARRIS, a citizen of the United States, residing at Evansville, in the county of Vanderburg and State of Indiana, have invented new and useful Improvements in Saw-Teeth, of which the following is a specification.

My invention relates to improvements in saw-teeth; and it consists in the peculiar construction and combination of devices, that will be more fully set forth hereinafter, and particularly pointed out in the claims.

The object of my invention is to provide a saw with teeth which are insertible therein and readily detachable therefrom and are cheap and simple in construction.

Figure 1:
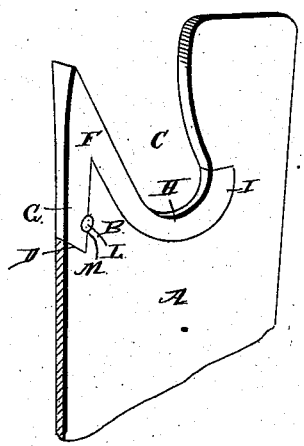
Figure 2:
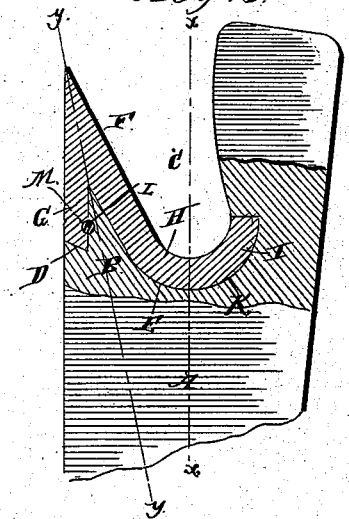
Figure 4:
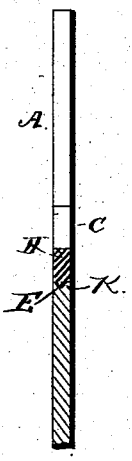
Figure 3:
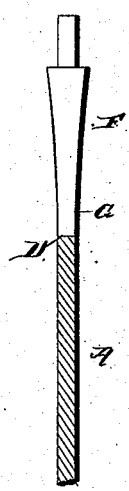
Figure 5:
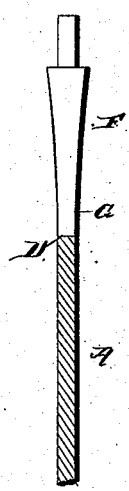

In the accompanying drawings, Figure 1 is a perspective view of a portion of a saw provided with an insertible tooth embodying my improvements. Fig. 2 is a longitudinal sectional view of the same. Fig. 3 is an edge elevation showing the front side of the insertible tooth. Fig. 4 is a sectional view taken on the line $x\,x$ of Fig. 2. Fig. 5 is a similar view taken on the line $y\,y$ of Fig. 2.

A represents the blade of the saw, which is provided with the solid projections B and the curved recesses C between the said projections. In the point of each projection, on the front side thereof, is made a recess, D, and on the rear side of the projection is a groove, E, which extends also over the edge of each recess C.

F represents an insertible tooth, which is made of highly-tempered steel, is substantially V-shaped in elevation, and thereby provided with a front arm, G, which fits in the recess D, and with a rear arm, H, which is adapted to fit on the rear edge of the projection. The said arm H has a curved extension, I, to fit in the recess C, and the said arm and the said extension are provided with a continuous rib or flange, K, which fits in the groove E, as shown. The point of each solid projection B is of somewhat less width than the insertible tooth at the angle formed by its arms, so that a recess or hollow, $a$, is formed on each side of the point of the solid projection.

L represents a pin or rivet, which is secured in a transverse opening, M, that is made in the opposing sides of the arm G of the insertible tooth and the front of the solid tooth B. The said pin or rivet is swaged or clinched in the said opening and serves as a key to secure the insertible tooth rigidly in position. The groove in the rear side of the solid projection and the rib or flange in the insertible tooth that fits in the said groove effectually prevent lateral motion of the insertible tooth, and the pin, rivet, or key secures the insertible tooth so firmly to the saw that it cannot become accidentally disengaged therefrom.

The hollows $a$ on each side of the point of each solid projection prevent sawdust from clogging in the kerf and thereby choking the saw.

Having thus described my invention, I claim—

1. The combination of the saw-blade having the solid projections B, provided with the recesses D, and the insertible saw-teeth having the arms G H, adapted to fit on the front and rear edges of the solid projection, and the pins, rivets, or keys to secure the said insertible projections to the solid projections, substantially as described.

2. The combination of the saw-blade having the solid projections B and the curved recesses C, provided with the grooves E, and the insertible teeth having the arms G H to fit on opposite sides of the solid projections, the arms H having extensions I to fit in recesses C, said arms H being provided with the ribs or flanges to engage the grooves E, substantially as described.

3. The combination of the saw-blade having the solid projections B, provided with the recesses D, the insertible saw-teeth having the arms G, to fit in recesses D, and the arms H, to bear on the rear side of the projections, and the pins, rivets, or keys fitted in transverse openings formed in the opposing sides of the solid projections and arms G, substantially as described.

4. The saw-blade having the solid projections B, in combination with the insertible teeth secured on the points of the solid projections, the latter being narrower than the corresponding portions of the insertible teeth, and thereby forming hollows $a$, for the purpose set forth, substantially as described.

In testimony that I claim the foregoing as my own I have hereto affixed my signature in presence of two witnesses.

ENOCH HARRIS.

Witnesses:
DANIEL GORDON,
A. C. TANNER.